US012647180B2

(12) United States Patent
Nishimoto et al.

(10) Patent No.: US 12,647,180 B2
(45) Date of Patent: Jun. 2, 2026

(54) OPTICAL TRANSMISSION SYSTEM, OPTICAL RECEIVING APPARATUS, AND DELAY MEASUREMENT METHOD

(71) Applicant: NIPPON TELEGRAPH AND TELEPHONE CORPORATION, Tokyo (JP)

(72) Inventors: Keita Nishimoto, Musashino (JP); Kota Asaka, Musashino (JP); Yukio Toyoshima, Tokyo (JP)

(73) Assignee: NTT, Inc., Tokyo (JP)

( * ) Notice: Subject to any disclaimer, the term of this patent is extended or adjusted under 35 U.S.C. 154(b) by 259 days.

(21) Appl. No.: 18/279,153

(22) PCT Filed: Mar. 12, 2021

(86) PCT No.: PCT/JP2021/010061
§ 371 (c)(1),
(2) Date: Aug. 28, 2023

(87) PCT Pub. No.: WO2022/190357
PCT Pub. Date: Sep. 15, 2022

(65) Prior Publication Data
US 2024/0305370 A1      Sep. 12, 2024

(51) Int. Cl.
*H04B 10/077* (2013.01)
*H04B 10/40* (2013.01)
(Continued)

(52) U.S. Cl.
CPC ......... *H04B 10/0775* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS 6,509,985 B1 *   1/2003   Kajita ................. H04J 14/0305
                                                            398/154
2008/0205889 A1 *  8/2008   Aoki ................... H04Q 11/0005
                                                             398/51
(Continued)

FOREIGN PATENT DOCUMENTS

JP        2014-216710 A        11/2014
JP        2016-103766 A        6/2016
JP        2020-102664 A        7/2020

OTHER PUBLICATIONS

Machizawa et al., "Development of a Cascadable Passing Through Precision UDP Time-Stamping Device", The Journal of The Institute of Electronics, Information and Communication Engineers B, 2005, 11 pages.

*Primary Examiner* — Darren E Wolf
(74) *Attorney, Agent, or Firm* — Harness, Dickey & Pierce, 1P.L.C.

(57) ABSTRACT
Provided is an optical transmission system including: an optical transmission apparatus; an optical reception apparatus; a communication device that is a delay measurement target; and a transmission device that transmits a signal between the optical reception apparatus and the communication device, in which the optical transmission apparatus includes a main signal transfer unit that transmits a main signal, the transmission device transmits, to the optical reception apparatus, a first main signal transmitted from the optical transmission apparatus and transmitted via the communication device and a second main signal transmitted from the optical transmission apparatus and not transmitted via the communication device, and the optical reception apparatus includes a reception processing unit that measures a delay occurring in the communication device by using the first main signal and the second main signal transmitted from the transmission device.

8 Claims, 9 Drawing Sheets

(51) Int. Cl.
    *H04B 10/50*       (2013.01)
    *H04B 10/60*       (2013.01)

(56)           References Cited

U.S. PATENT DOCUMENTS

| | | | |
|---|---|---|---|
| 2010/0209121 A1* | 8/2010 | Tanimura | H04J 14/06 |
| | | | 359/239 |
| 2012/0263456 A1* | 10/2012 | Tanaka | H04B 10/5055 |
| | | | 398/25 |
| 2018/0034549 A1* | 2/2018 | Kikuchi | H04B 10/40 |
| 2022/0021456 A1 | 1/2022 | Otsuki et al. | |

* cited by examiner

OPTICAL TRANSMISSION SYSTEM, OPTICAL RECEIVING APPARATUS, AND DELAY MEASUREMENT METHOD

CROSS-REFERENCE TO RELATED APPLICATIONS

This application is a 371 National Stage of International Application No. PCT/JP2021/010061, filed on Mar. 12, 2021. The entire disclosure of the above application is incorporated herein by reference.

TECHNICAL FIELD

The present invention relates to an optical transmission system, an optical reception apparatus, and a delay measurement method.

BACKGROUND ART

Conventionally, as one method for measuring a delay in a network, a method using a probe packet has been proposed (see, for example, Non Patent Literature 1). The method described in Non Patent Literature 1 proposes delay measurement of a "pass-through method" in which a time stamp is added to a probe packet for each measurement point of a network for which delay measurement is desired.

FIG. 9 is a diagram illustrating the method shown in Non Patent Literature 1. As illustrated in FIG. 9, in the delay measurement method shown in Non Patent Literature 1, for example, a system including a probe transmission unit 1, a plurality of clock generation units 2-1 to 2-3, a plurality of time stamp adding units 3-1 to 3-3, a plurality of communication devices 4-1 to 4-2, and a probe reception unit 5 is used. The probe transmission unit 1 transmits a probe packet (user datagram protocol (UDP) packet) to the probe reception unit 5.

The probe packet transmitted from the probe transmission unit 1 passes through the time stamp adding unit 3-1, the communication device 4-2, the time stamp adding unit 3-2, the communication device 4-2, and the time stamp adding unit 3-3 in that order and is received by the probe reception unit. The time stamp adding units 3-1 to 3-3 add time information to the end of the probe packet. For example, the time stamp adding units 3-1 to 3-3 add time information at the time when the probe packet is input to the end of the probe packet. Note that the clock generation units 2-1 to 2-3 synchronized with each other are connected to the time stamp adding units 3-1 to 3-3, and accurate time information is provided to the time stamp adding units 3-1 to 3-3.

Through the above processing, the probe packet received by the probe reception unit 5 includes the time information added by each of the time stamp adding units 3-1 to 3-3. The probe reception unit 5 can measure a delay (for example, the total of a processing delay, a queuing delay, and a serialization delay) occurring in each of the communication devices 4-1 and 4-2 by using each piece of time information.

CITATION LIST

Non Patent Literature

Non Patent Literature 1: Machizawa, et al., "Development of a Cascadable Passing Through Precision UDP Time-Stamping Device," Institute of Electronics, Information and Communication Engineers Transactions B, 2005

SUMMARY OF INVENTION

Technical Problem

However, in the above conventional delay measurement method, since a probe packet for delay measurement is inserted, the delay of a main signal increases. Furthermore, the clocks provided to the time stamp adding units 3-1 to 3-3 need to be synchronized with high accuracy, which complicates network management. Therefore, there is a demand for a method of measuring a delay of a main signal by a simple method while suppressing the delay.

In view of the above circumstances, an object of the present invention is to provide a technique capable of measuring a delay of a main signal by a simple method while suppressing the delay.

Solution to Problem

According to one aspect of the present invention, there is provided an optical transmission system including: an optical transmission apparatus; an optical reception apparatus; a communication device that is a delay measurement target; and a transmission device that transmits a signal between the optical reception apparatus and the communication device, in which the optical transmission apparatus includes a main signal transfer unit that transmits a main signal, the transmission device transmits, to the optical reception apparatus, a first main signal transmitted from the optical transmission apparatus and transmitted via the communication device and a second main signal transmitted from the optical transmission apparatus and not transmitted via the communication device, and the optical reception apparatus includes a reception processing unit that measures a delay occurring in the communication device by using the first main signal and the second main signal transmitted from the transmission device.

According to one aspect of the present invention, there is provided an optical reception apparatus in an optical transmission system including an optical transmission apparatus, the optical reception apparatus, a communication device that is a delay measurement target, and a transmission device that transmits a signal between the optical reception apparatus and the communication device, the optical reception apparatus including a reception processing unit that measures a delay occurring in the communication device by using a first main signal transmitted from the optical transmission apparatus and transmitted at least via the communication device and a second main signal transmitted from the optical transmission apparatus and not transmitted via the communication device.

According to one aspect of the present invention, there is provided a delay measurement method in an optical transmission system including an optical transmission apparatus, an optical reception apparatus, a communication device that is a delay measurement target, and a transmission device that transmits a signal between the optical reception apparatus and the communication device, the delay measurement method including: transmitting, by the optical transmission apparatus, a main signal; transmitting, by the transmission device, to the optical reception apparatus, a first main signal transmitted from the optical transmission apparatus and transmitted via the communication device and a second main signal transmitted from the optical transmission apparatus and not transmitted via the communication device; and measuring, by the optical reception apparatus, a delay occurring in the communication device by using the first main signal and the second main signal transmitted from the transmission device.

Advantageous Effects of Invention

According to the present invention, it is possible to measure the delay of the main signal by a simple method while suppressing the delay.

DESCRIPTION OF EMBODIMENTS

Embodiments of the present invention will be described below with reference to the drawings.

Outline

First, an outline of the present invention will be described.

An optical transmission system according to the present invention includes an optical transmission apparatus, an optical transmission device, a delay measurement target communication device, and an optical reception apparatus. Here, the delay measurement target communication device is, for example, a relay device such as a switch or a router. The optical transmission apparatus transmits a main signal to the optical reception apparatus via one or a plurality of lines. For example, in a case where the optical transmission apparatus transmits a main signal to the optical reception apparatus via one line, the optical transmission device branches the main signal and transfers the main signal to the delay measurement target communication device and the optical reception apparatus. In a case where the optical transmission apparatus transmits the main signal to the optical reception apparatus via a plurality of lines, the optical transmission device transfers the main signal transmitted from one line to the delay measurement target communication device, and transfers the main signal transmitted from another line to the optical reception apparatus.

The main signal transferred to the delay measurement target communication device is subjected to address table reference for transfer, serialization processing, and the like in the delay measurement target communication device, and then transferred to the optical transmission device again. The optical transmission device transfers the main signal transferred from the delay measurement target communication device to the optical reception apparatus. The optical reception apparatus calculates a difference (t2–t1) between a reception time t1 of the optical signal that is not transferred via the delay measurement target communication device and a reception time t2 of the optical signal transferred via the delay measurement target communication device. This difference is the total value of a processing delay, a queuing delay, and a serialization delay in the delay measurement target communication device.

Measuring the delay as described above does not cause an increase in the delay of the main signal as in the related art. Furthermore, since the delay is also measured inside the optical reception apparatus, there is no need to synchronize a plurality of clocks. As a result, it is possible to measure the delay of the main signal by a simple method while suppressing the delay.

Hereinafter, a plurality of embodiments for implementing the above method will be described.

First Embodiment

Figure 1:
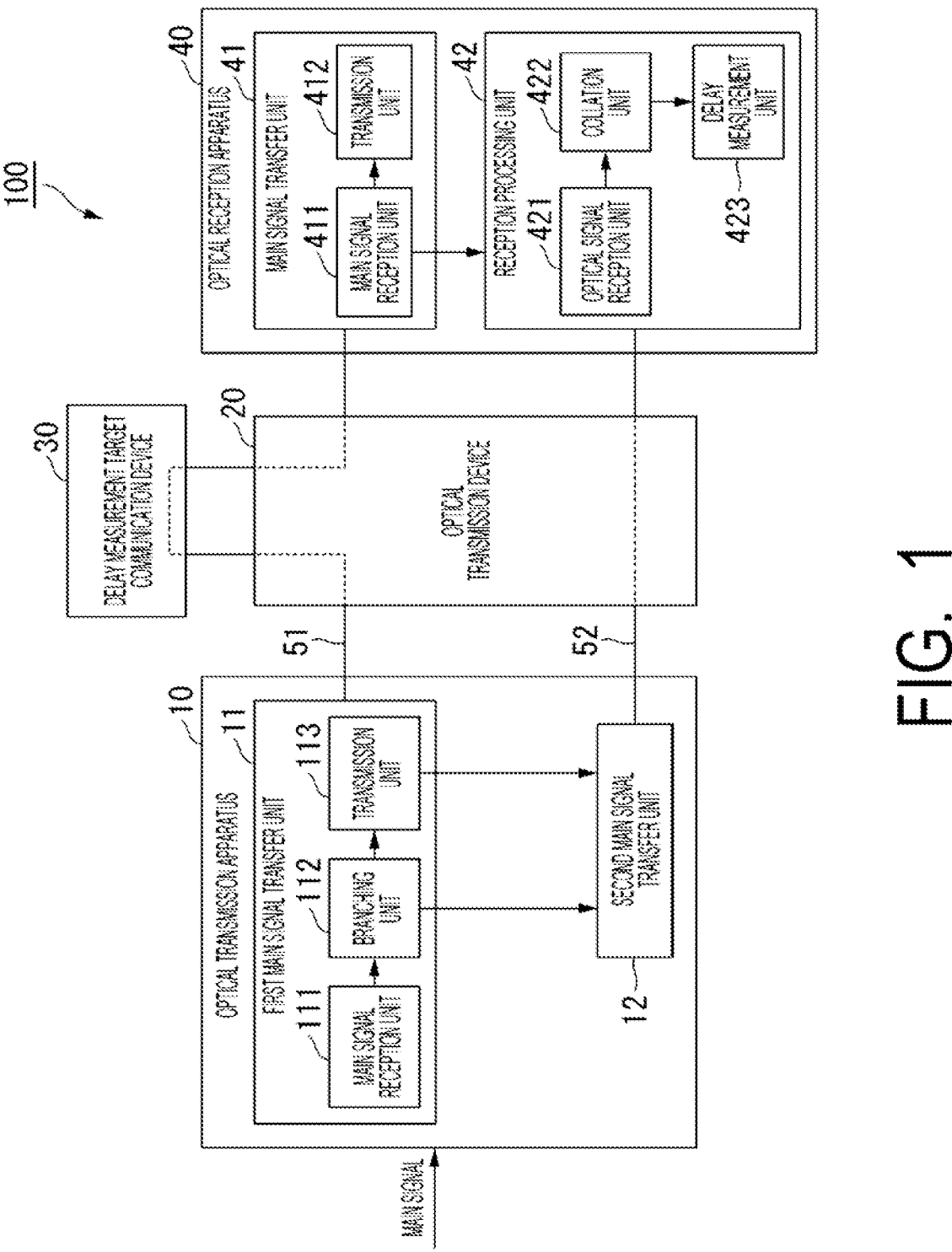
FIG. 1 is a diagram illustrating a system configuration of an optical transmission system according to a first embodiment.

FIG. 1 is a diagram illustrating a system configuration of an optical transmission system 100 according to a first embodiment. The optical transmission system 100 includes an optical transmission apparatus 10, an optical transmission device 20, a delay measurement target communication device 30, and an optical reception apparatus 40. The optical transmission apparatus 10 and the optical transmission device 20, the optical transmission device 20 and the delay measurement target communication device 30, and the optical transmission device 20 and the optical reception apparatus 40 are connected to each other via optical transmission lines.

Upon receiving a main signal from a device such as an adjacent network or server, the optical transmission apparatus 10 transmits the received main signal to the optical transmission device 20 via lines 51 and 52 that are optical transmission lines. In the first embodiment, a main signal of an optical signal is input to the optical transmission apparatus 10. The lines 51 and 52 may be physically provided in the same fiber, or may be provided in different independent fibers. In a case where the line 51 and the line 52 are physically provided in the same fiber, a method of wavelength-multiplexing main signals transmitted from the optical transmission apparatus 10 at different wavelengths and transmitting the wavelength-multiplexed main signals can be considered. In the first embodiment, a case where the line 51 and the line 52 are physically provided in the same fiber will be described as an example. Similarly, it is assumed that each line connecting the optical transmission device 20 and the optical reception apparatus 40 is physically provided in the same fiber.

The optical transmission device 20 transmits main signals transmitted from the optical transmission apparatus 10 to each of the delay measurement target communication device 30 and the optical reception apparatus 40. The optical transmission device 20 transmits the main signal received via the line 51 to the delay measurement target communication device 30. The optical transmission device 20 transmits the main signal received via the line 52 to the optical reception apparatus 40. In the first embodiment, the main signal transmitted by the optical transmission apparatus 10 via the line 51 is set as a first main signal, and the main signal transmitted by the optical transmission apparatus 10 via the line 52 is set as a second main signal. The optical transmission device 20 is a device with which branching and inserting an optical signal, such as a reconfigurable optical add/drop multiplexer (ROADM), are possible.

The delay measurement target communication device 30 is a device that is a delay measurement target. Here, the delay to be measured is a delay due to processing performed inside the device, and is, for example, a processing delay, a queuing delay, a serialization delay, or the like. Note that the delay to be measured is not limited thereto, and includes any delay due to processing performed inside the device. The delay measurement target communication device 30 transmits the main signal transmitted from the optical transmission device 20 to the optical transmission device 20 again. At this time, a processing delay, a queuing delay, and a serialization delay in the delay measurement target communication device described above occur.

The optical reception apparatus 40 measures a processing delay in the delay measurement target communication device 30 by using a plurality of main signals transmitted from the optical transmission device 20. For example, the optical reception apparatus 40 measures the processing delay in the delay measurement target communication device 30 by calculating the difference between the reception time of the first main signal and the reception time of the second main signal.

Next, specific configurations of functional units of the optical transmission apparatus 10 and the optical reception apparatus 40 will be described.

The optical transmission apparatus 10 includes a first main signal transfer unit (main signal transferor) 11 and a second main signal transfer unit (main signal transferor) 12. The first main signal transfer unit 11 transmits the first main signal to the optical transmission device 20. The first main signal transfer unit 11 includes a main signal reception unit 111, a branching unit (brancher) 112, and a transmission unit 113.

The main signal reception unit 111 receives a main signal from a device such as an adjacent network or server.

The branching unit 112 is, for example, a splitter. The main signal received by the main signal reception unit 111 is branched by the branching unit 112 into the transmission unit 113 and the second main signal transfer unit 12.

The transmission unit 113 transmits the input main signal to the line 51. In the first embodiment, the main signal transmitted from the transmission unit 113 is the first main signal. Note that the transmission unit 113 notifies the second main signal transfer unit 12 of the transmission timing of the first main signal before transmitting the first main signal.

The second main signal transfer unit 12 transmits the main signal branched by the branching unit 112 to the line 52 at the transmission timing notified from the transmission unit 113, that is, at the same timing as the transmission timing of the first main signal. In the first embodiment, the main signal transmitted from the second main signal transfer unit 12 is the second main signal. Note that the second main signal transfer unit 12 converts the wavelength of the second main signal into a wavelength different from the wavelength of the first main signal and transmits the converted wavelength to the line 52. This enables transmission of the second main signal without affecting the first main signal.

As described above, the optical transmission apparatus 10 in the first embodiment transmits main signals of the same data from different lines.

The optical reception apparatus 40 includes a main signal transfer unit 41 and a reception processing unit (reception processor) 42. The main signal transfer unit 41 transmits the first main signal to another network or device. The main signal transfer unit 41 includes a main signal reception unit 411 and a transmission unit 412.

The main signal reception unit 411 receives the first main signal. The main signal reception unit 411 records the time when the first main signal is received as first reception time information. The main signal reception unit 411 outputs the first main signal and the first reception time information to the reception processing unit 42. Note that a splitter may be used to output a signal from the main signal reception unit 411 to the reception processing unit 42. The main signal reception unit 411 outputs the received first main signal to the transmission unit 412.

The transmission unit 412 transmits the first main signal output from the main signal reception unit 411 to another network or device.

The reception processing unit 42 processes the main signal received by the optical reception apparatus 40. The reception processing unit 42 includes an optical signal reception unit 421, a collation unit 422, and a delay measurement unit 423. The optical signal reception unit 421 receives the second main signal transmitted from the optical transmission device 20. The optical signal reception unit 421 records the time when the second main signal is received as second reception time information. The optical signal reception unit 421 outputs the second main signal and the second reception time information to the collation unit 422.

The collation unit 422 collates whether the first main signal and the second main signal received by the optical reception apparatus 40 are main signals of the same data by using the first main signal output from the main signal transfer unit 41 and the second main signal output from the optical signal reception unit 421.

In a case where the first main signal and the second main signal received by the optical reception apparatus 40 are main signals of the same data, the collation unit 422 outputs first reception time information of the first main signal and second reception time information of the second main signal, which are main signals of the same data, to the delay measurement unit 423. On the other hand, in a case where the first main signal and the second main signal received by the optical reception apparatus 40 are not main signals of the same data, the collation unit. 422 performs collation with other main signals again after a predetermined period has elapsed.

The reason why the collation unit 422 performs the collation again after the predetermined period has elapsed is that there is a likelihood that the main signal is not received by the optical reception apparatus 40 due to an influence of a delay or a transmission delay by the delay measurement target communication device 30. Therefore, after the predetermined period has elapsed, there is a high likelihood that the main signal matching the main signal already received is obtained.

The delay measurement unit 423 measures a delay occurring in the delay measurement target communication device 30 by using the first reception time information and the second reception time information output from the collation unit 422. Specifically, the delay measurement unit 423 calculates the delay time occurring in the delay measurement target communication device 30 by subtracting the time indicated by the first reception time information from the time indicated by the second reception time information.

The information on the delay time calculated by the delay measurement unit 423 may be output to another device via a network, or may be displayed on a display device when the optical reception apparatus 40 includes the display device.

Figure 2:
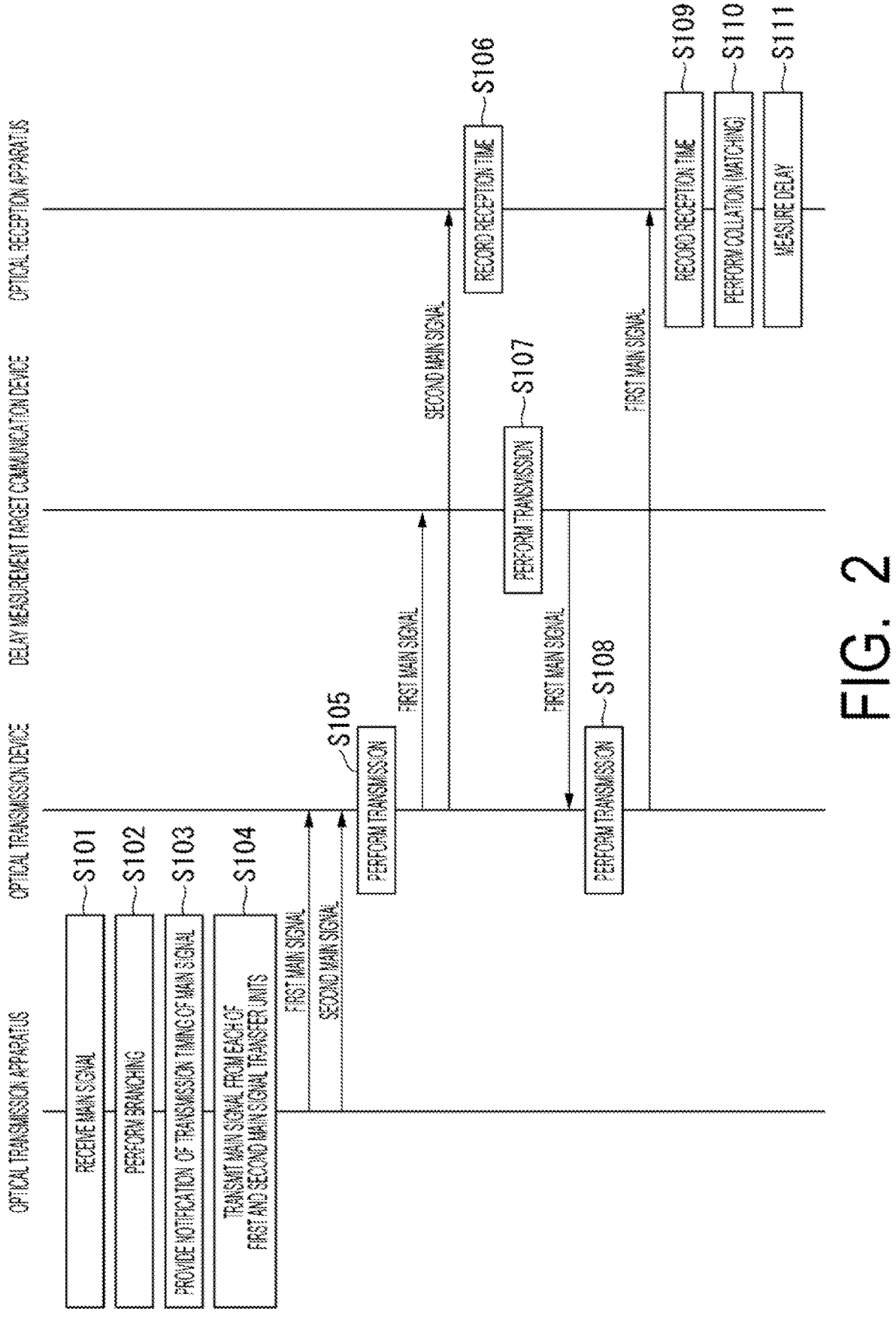
FIG. 2 is a sequence diagram illustrating a flow of processing of the optical transmission system according to the first embodiment.

FIG. 2 is a sequence diagram illustrating a flow of processing of the optical transmission system 100 according to the first embodiment.

The main signal reception unit Ill receives a main signal (optical signal) from the outside (step S101). The main signal reception unit 111 outputs the received main signal to the branching unit 112. The main signal output from the main signal reception unit 111 is branched by the branching unit 112 (step S102), and is input to the transmission unit 113 and the second main signal transfer unit 12.

When the main signal is input, the transmission unit 113 notifies the second main signal transfer unit 12 of the transmission timing of the main signal (step S103). Accordingly, the second main signal transfer unit 12 can transmit the main signal at the same timing as the first main signal transfer unit 11. The first main signal transfer unit 11 and the second main signal transfer unit 12 transmit main signals at the same timing (step S104). Specifically, the first main signal transfer unit 11 transmits the main signal that is the first main signal via the line 51. The second main signal transfer unit 12 transmits the main signal that is the second main signal via the line 52 at the timing notified from the first main signal transfer unit 11.

The first main signal and the second main signal transmitted from the optical transmission apparatus 10 are received by the optical transmission device 20. The optical transmission device 20 transfers the received first main signal and second main signal (step S105). Specifically, the optical transmission device 20 transmits the first main signal received via the line 51 to the optical transmission device 20. The optical transmission device 20 transmits the second main signal received via the line 52 to the optical reception apparatus 40.

The optical signal reception unit 421 of the optical reception apparatus 40 receives the second main signal transmitted from the optical transmission device 20. The optical signal reception unit 421 records the time when the second main signal is received as second reception time information (step S106). The optical signal reception unit 421 outputs the second main signal and the second reception time information to the collation unit 422.

The delay measurement target communication device 30 receives the first main signal transmitted from the optical transmission device 20. The delay measurement target communication device 30 transmits the received first main signal to the optical reception apparatus 40 again (step S107). The optical transmission device 20 transmits the first main signal transmitted from the delay measurement target communication device 30 to the optical reception apparatus 40 (step S108).

The main signal reception unit 411 of the optical reception apparatus 40 receives the first main signal transmitted from the optical transmission device 20. The main signal reception unit 411 records the time when the first main signal is received as first reception time information (step S109). The main signal reception unit 411 outputs the first main signal and the first reception time information to the collation unit 422. Further, the main signal reception unit 411 outputs the first main signal to the transmission unit 412. The first main signal output to the transmission unit 412 is transmitted to the outside.

The collation unit 422 collates whether the first main signal and the second main signal received by the optical reception apparatus 40 are main signals of the same data by using the first main signal output from the main signal transfer unit 41 and the second main signal output from the optical signal reception unit 421 (step S110). Specifically, the collation unit 422 photoelectrically converts the first main signal and the second main signal, and compares the first main signal and the second main signal. In a case where the first main signal and the second main signal after photoelectric conversion are the same, the collation unit 422 determines that the first main signal and the second main signal after photoelectric conversion are main signals transmitted at the same timing. On the other hand, in a case where the first main signal and the second main signal after photoelectric conversion are different, the collation unit 422 determines that the first main signal and the second main signal after photoelectric conversion are not main signals transmitted at the same timing.

Here, description will be made on the assumption that the first main signal and the second main signal after photoelectric conversion match. The collation unit 422 outputs the first reception time information of the matched first main signal and the second reception time information of the matched second main signal to the delay measurement unit 423. The delay measurement unit 423 measures a delay occurring in the delay measurement target communication device 30 by using the first reception time information and the second reception time information output from the collation unit 422 (step S111). Specifically, the delay measurement unit 423 calculates the delay time occurring in the delay measurement target communication device 30 by subtracting the time indicated by the first reception time information from the time indicated by the second reception time information.

According to the optical transmission system 100 configured as described above, the optical transmission apparatus 10 transmits the main signal, the optical transmission device 20 transmits the main signal obtained by transmitting the main signal transmitted from the optical transmission apparatus 10 to the delay measurement target communication device 30 and the main signal transmitted from the optical transmission apparatus 10 to the optical reception apparatus 40, and the optical reception apparatus measures the delay occurring in the delay measurement target communication device 30 by using the plurality of main signals transmitted from the optical transmission device 20. Accordingly, the optical transmission apparatus 10 only needs to transmit the main signal, and does not need to insert a probe packet as in the related art. Therefore, this does not cause an increase in the delay of the main signal as in the related art. Furthermore, since the delay is also measured inside the optical reception apparatus 40, there is no need to synchronize a plurality of clocks. Therefore, it is possible to measure the delay of the main signal by a simple method while suppressing the delay.

Furthermore, in the optical transmission system 100, in order to measure the delay in the optical reception apparatus 40, the optical transmission apparatus 10 transmits the first main signal and the second main signal of the same data from different lines. The first main signal is received by the optical reception apparatus 40 via the delay measurement target communication device 30, and the second main signal is received by the optical reception apparatus 40 without passing through the delay measurement target communication device 30. Therefore, by calculating the difference between the reception time of the first main signal and the reception time of the second main signal, the optical reception apparatus 40 can calculate the delay time in consideration of at least the delay occurring in the delay measurement target communication device 30.

Hereinafter, a modification of the optical transmission system 100 according to the first embodiment will be described.

In a case where signal collision does not occur between the line 51 and the line 52, such as a case where wavelength conversion is performed at the time of dropping and adding from the optical transmission device 20 to the delay measurement target communication device 30, or a case where physical ports are separately prepared for the first main signal transfer unit 11 and the second main signal transfer unit 12 in the optical transmission apparatus 10, the optical transmission apparatus 10 may be configured to transmit the first main signal and the second main signal at the same wavelength. In this case, also in the optical reception apparatus 40, physical ports are prepared separately for the main signal transfer unit 41 and the reception processing unit 42.

With such a configuration, while the number of physical ports required increases, an increase in the transmission band can be suppressed.

Second Embodiment

In the first embodiment, a configuration in which the first main signal and the second main signal are transmitted from two lines in the optical transmission apparatus has been described. In a second embodiment, a configuration in which a main signal is transmitted from one line in an optical transmission apparatus and the main signal is branched in an optical transmission device will be described.

Figure 3:
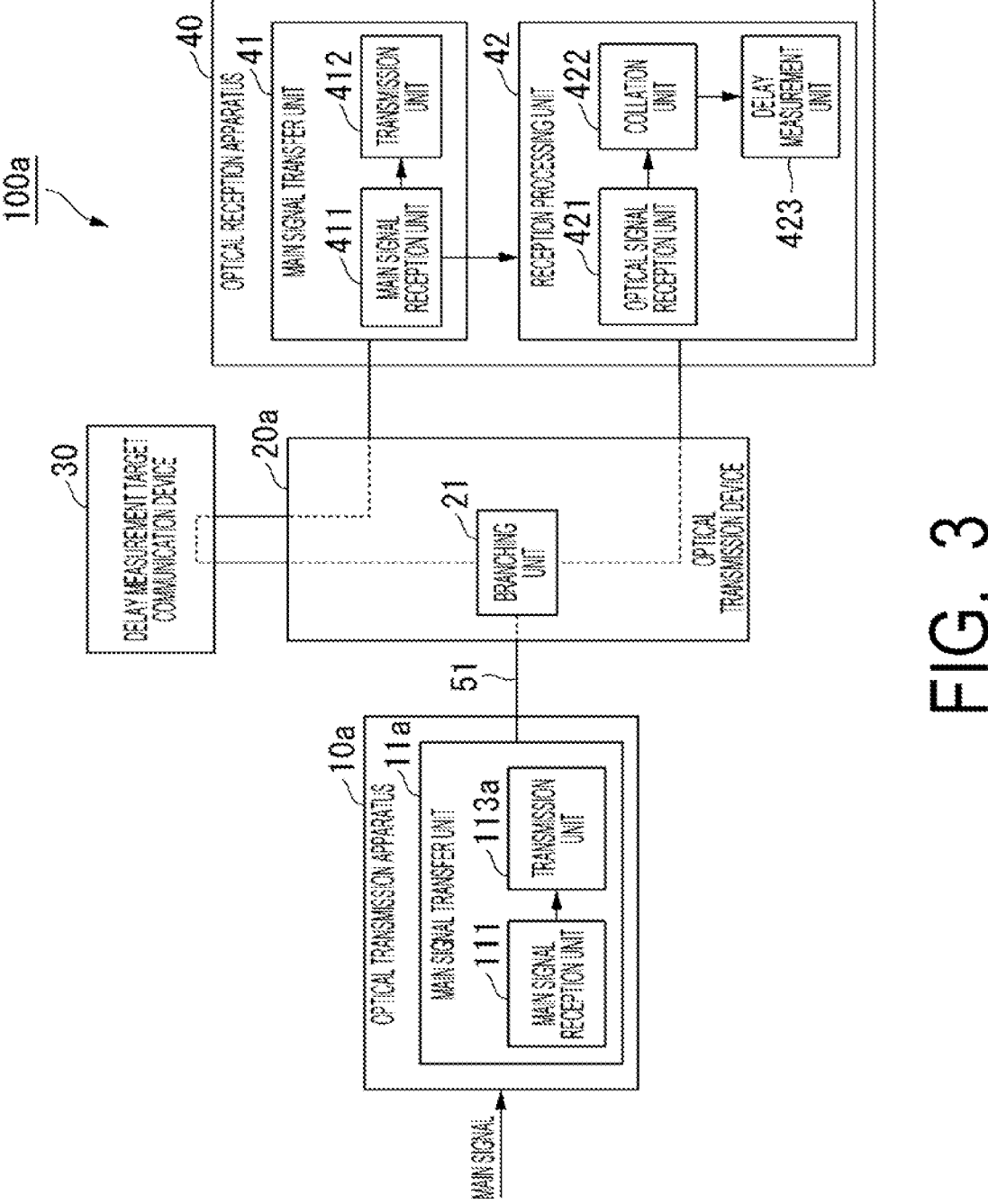
FIG. 3 is a diagram illustrating a system configuration of an optical transmission system according to a second embodiment.

FIG. 3 is a diagram illustrating a system configuration of an optical transmission system 100a according to the second embodiment. The optical transmission system 100a includes an optical transmission apparatus 10a, an optical transmission device 20a, a delay measurement target communication device 30, and an optical reception apparatus 40. The optical transmission apparatus 10a and the optical transmission device 20a, the optical transmission device 20a and the delay measurement target communication device 30, and the optical transmission device 20a and the optical reception apparatus 40 are connected to each other via optical transmission lines.

The optical transmission system 100a according to the second embodiment is different from the optical transmission system 100 according to the first embodiment in configurations of the optical transmission apparatus 10a and the optical transmission device 20a. Hereinafter, differences from the first embodiment will be described.

Upon receiving a main signal from a device such as an adjacent network or server, the optical transmission apparatus 10a transmits the received main signal to the optical transmission device 20a via a line Si that are optical transmission lines. In the second embodiment, a main signal of an optical signal is input to the optical transmission apparatus 10a.

The optical transmission device 20a branches the main signal transmitted from the optical transmission apparatus 10a, and transmits the branched main signal to each of the delay measurement target communication device 30 and the optical reception apparatus 40. Therefore, the optical transmission device 20a includes a branching unit 21. The branching unit 21 outputs the main signal transmitted from the optical transmission apparatus 10a to the delay measurement target communication device 30 and the optical reception apparatus 40. In the second embodiment, among the main signals branched at the branching unit 21, the main signal transmitted to the delay measurement target communication device 30 is set as a first main signal, and the main signal transmitted to the optical reception apparatus 40 without being transmitted to the delay measurement target communication device 30 is set as a second main signal.

Next, a specific configuration of functional units of the optical transmission apparatus 10a will be described.

The optical transmission apparatus 10a includes a main signal transfer unit 11a. The main signal transfer unit 11a transmits the main signal to the optical transmission device 20a. The main signal transfer unit 11a includes a main signal reception unit 111 and a transmission unit 113a. In this way, the optical transmission apparatus 10a according to the second embodiment does not include the branching unit 112 that branches the main signal.

The transmission unit 113a transmits the main signal output from the main signal reception unit 111 to the line 51.

Figure 4:
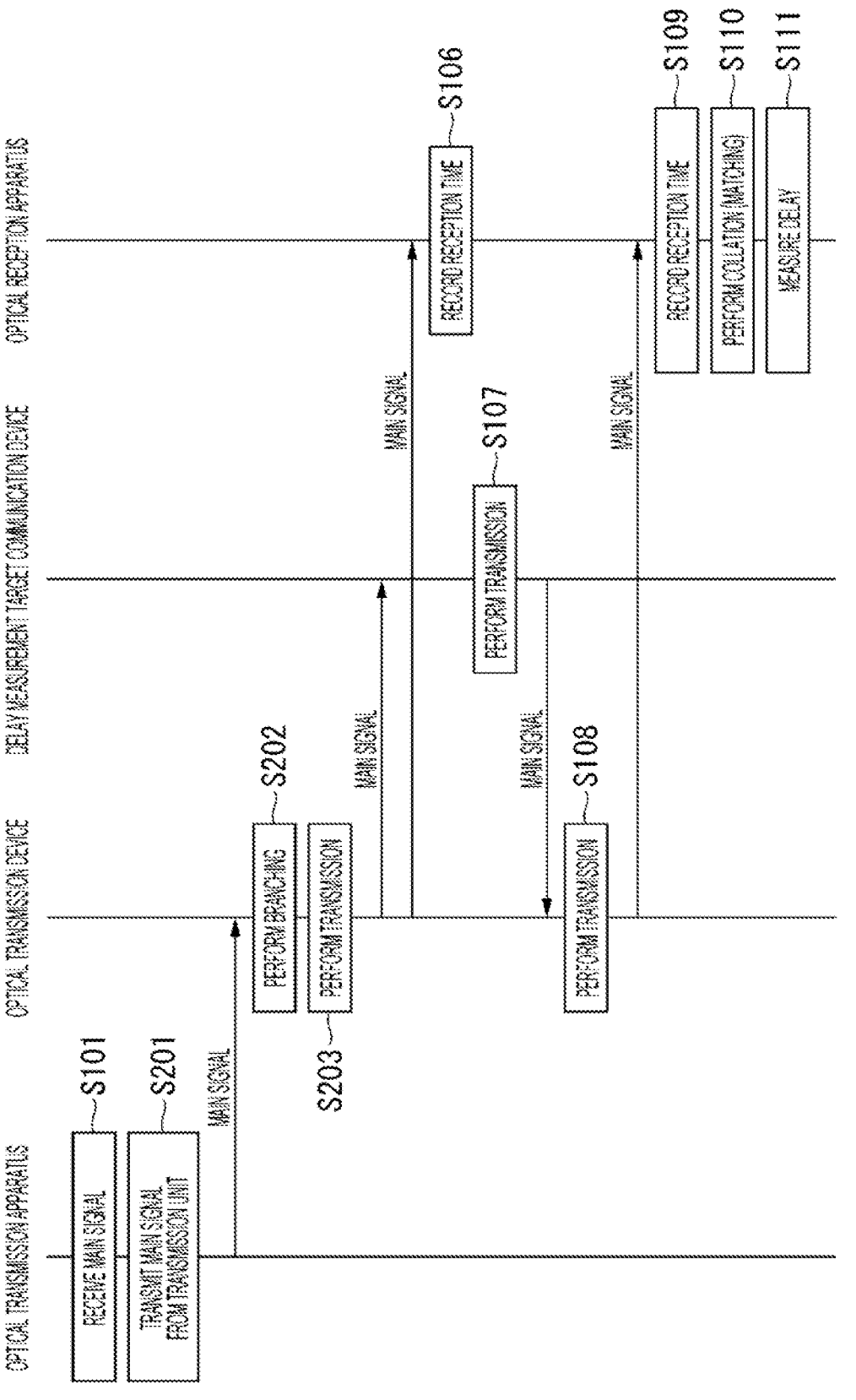
FIG. 4 is a sequence diagram illustrating a flow of processing of the optical transmission system according to the second embodiment.

FIG. 4 is a sequence diagram illustrating a flow of processing of the optical transmission system 100a according to the second embodiment. In FIG. 4, the same processing steps as those in FIG. 2 are denoted by the same reference numerals as those used in FIG. 2, and description thereof is omitted.

When the main signal is output from the main signal reception unit 111 to the transmission unit 113a in step S101, the transmission unit 113a transmits the main signal via the line 51 (step S201).

The main signal transmitted from the optical transmission apparatus 10a is received by the optical transmission device 20a. The main signal received by the optical transmission device 20a is branched by the branching unit 21 (step S202). The optical transmission device 20a transmits the main signal branched by the branching unit 21 to the delay measurement target communication device 30 as a first main signal. Further, the optical transmission device 20a transmits the main signal branched by the branching unit 21 to the optical reception apparatus 40 as a second main signal (step S203). Thereafter, the processing from step S106 to step S111 is executed.

According to the optical transmission system 100a configured as described above, effects similar to those of the first embodiment can be obtained.

As in the first embodiment, in a case where the first main signal and the second main signal are transmitted from the optical transmission apparatus 10 through different lines, if the transmission timings of the first main signal and the second main signal deviate from each other, there is a likelihood of affecting the measurement of the delay. On the other hand, in the optical transmission system 100a, the optical transmission apparatus 10a does not transmit the main signal from the plurality of lines. Accordingly, the transmission timings of the first main signal and the second main signal need not be matched in the optical transmission apparatus 10a. As a result, the delay time can be calculated more accurately.

Third Embodiment

In the first embodiment and the second embodiment, the configuration for measuring the delay in one delay measurement target communication device has been described. In a third embodiment, a configuration for measuring a delay in a plurality of delay measurement target communication devices will be described.

Figure 5:
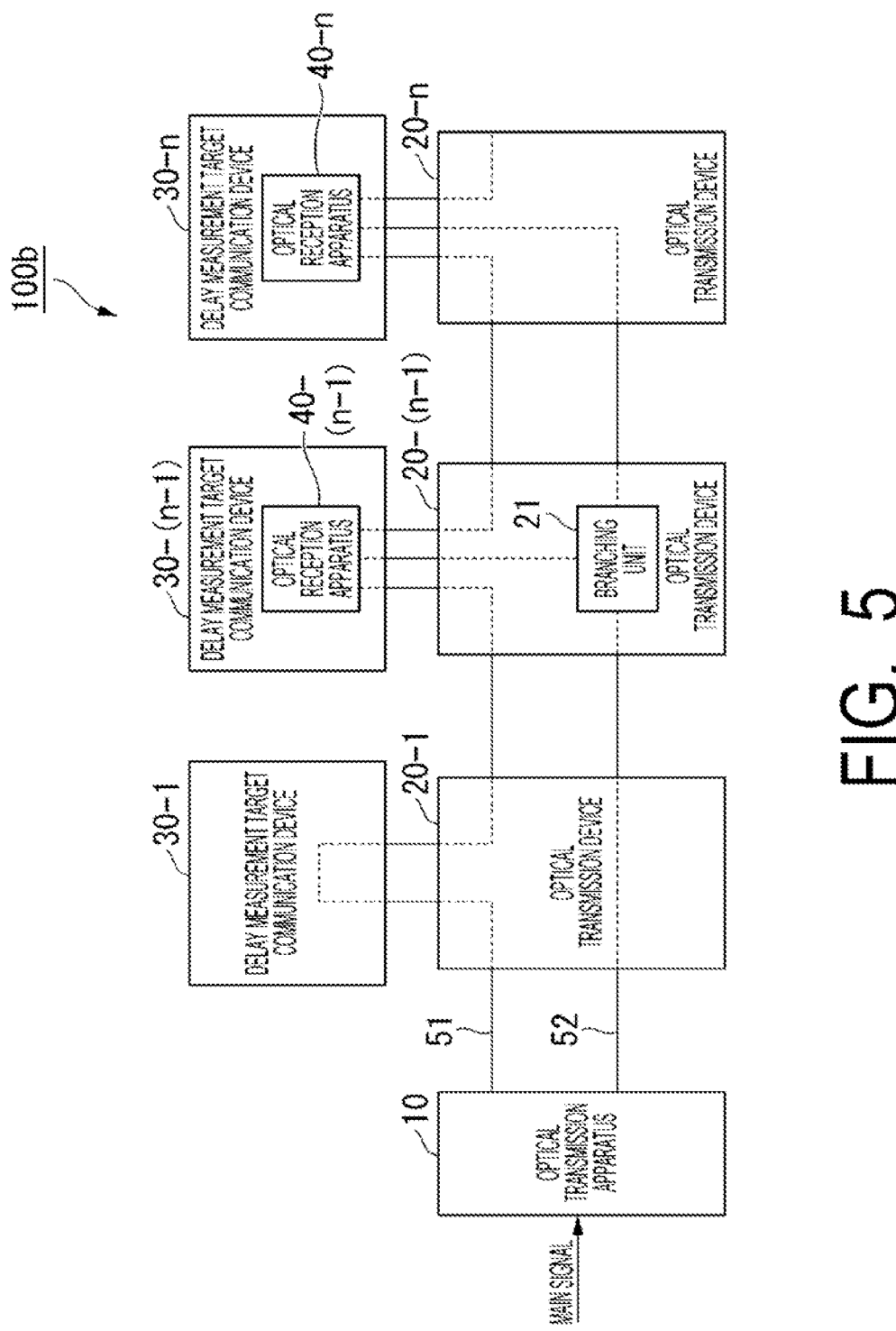
FIG. 5 is a diagram illustrating a system configuration of an optical transmission system according to a third embodiment.

FIG. 5 is a diagram illustrating a system configuration of an optical transmission system 100b according to the third embodiment. The optical transmission system 100b includes an optical transmission apparatus 10, a plurality of optical transmission devices 20-1 to 20-n (n is an integer of 3 or more), and a plurality of delay measurement target communication devices 30-1 to 30-n. In the optical transmission system 100b, optical reception apparatuses 40 are provided inside some of the delay measurement target communication devices 30. Accordingly, it is possible to measure a delay occurring in each delay measurement target communication device 30.

The optical transmission apparatus 10, the optical transmission device 20-1, and the delay measurement target communication device 30-1 illustrated in FIG. 5 have configurations similar to those of the apparatus and devices with the same name in the first embodiment.

Differences from the first embodiment are that the optical reception apparatuses 40-(n−1) to 40-n are provided inside delay measurement target communication devices 30-(n−1) to 30-n, respectively, that the optical transmission device 20-(n−1) includes a branching unit 21 as in the second embodiment, and that in the optical transmission device 20-n, the first main signal and the second main signal transmitted from the optical transmission device 20-(n−1) are input to the delay measurement target communication device 30-n. In this way, in a case where the optical reception apparatuses 40-(n−1) to 40-n are provided inside the delay measurement target communication devices 30-(n−1) to 30-n, respectively, it is desirable that the delay measurement target communication devices 30-(n−1) to 30-n be implemented as hardware parts in order to guarantee accuracy.

The configurations of the optical reception apparatuses 40-(n−1) to 40-n are similar to the configurations of the apparatuses with the same names in the first embodiment and the second embodiment.

With the above configuration, the optical reception apparatus 40-(n−1) in the delay measurement target communication device 30-(n−1) can measure the delay occurring in the preceding delay measurement target communication device 30 (in FIG. 5, the delay measurement target communication device 30-1). The optical reception apparatus 40-n in the delay measurement target communication device 30-n can measure the total of the delays occurring in the delay measurement target communication devices 30-1 to 30-(n−1).

As processing of the optical transmission system 100b according to the third embodiment, the following flow is obtained.

The optical transmission apparatus 10 transmits the first main signal to the optical transmission device 20-1 via the line 51. The optical transmission apparatus 10 transmits the second main signal to the optical transmission device 20-1 via a line 52 at the same timing as the transmission of the first main signal.

The optical transmission device 20-1 transmits the first main signal received via a line 51 to the delay measurement target communication device 30-1. The optical transmission device 20-1 transmits the second main signal received via the line 52 to the optical transmission device 20-(n−1). The delay measurement target communication device 30-1 transmits the first main signal transmitted from the optical transmission device 20-1 to the optical transmission device 20-1 again. The optical transmission device 20-1 transmits the first main signal transmitted from the delay measurement target communication device 30-1 to the optical transmission device 20-(n−1).

The optical transmission device 20-(n−1) transmits the first main signal transmitted from the optical transmission device 20-1 to the delay measurement target communication device 30-(n−1). Further, the optical transmission device 20-(n−1) causes the branching unit 21 to branch the second main signal transmitted from the optical transmission device 20-1. The optical transmission device 20-(n−1) transmits the second main signal branched by the branching unit 21 to the delay measurement target communication device 30-(n−1) and the optical transmission device 20-n.

The delay measurement target communication device 30-(n−1) transmits the first main signal transmitted from the optical transmission device 20-(n−1) to the optical transmission device 20-(n−1) again. The optical transmission device 20-(n−1) transmits the first main signal transmitted from the delay measurement target communication device 30-(n−1) to the optical transmission device 20-n.

Further, the optical reception apparatus 40-(n−1) of the delay measurement target communication device 30-(n−1) measures the delay occurring in the delay measurement target communication device 30-1 by using the input first main signal and second main signal.

The optical transmission device 20-n transmits the first main signal transmitted from the optical transmission device 20-(n−1) to the delay measurement target communication device 30-n. Further, the optical transmission device 20-n transmits the second main signal transmitted from the optical transmission device 20-(n−1) to the delay measurement target communication device 30-n.

The delay measurement target communication device 30-n transmits the first main signal transmitted from the optical transmission device 20-n to the optical transmission device 20-n again. The optical transmission device 20-n transmits the first main signal transmitted from the delay measurement target communication device 30-n to the outside.

Further, the optical reception apparatus 40-n of the delay measurement target communication device 30-n measures the delay occurring in the delay measurement target communication device 30-(n=1) from the delay measurement target communication device 30-1 by using the input first main signal and second main signal.

According to the optical transmission system 100b configured as described above, the present invention can also be applied to a case where there are a plurality of communication devices as delay measurement targets.

Hereinafter, a modification of the optical transmission system 100b according to the third embodiment will be described.

In a case where signal collision does not occur between the line 51 and the line 52, such as a case where wavelength conversion is performed at the time of dropping and adding from the optical transmission device 20 to the delay measurement target communication device 30, or a case where physical ports are separately prepared for the first main signal transfer unit 11 and the second main signal transfer unit 12 in the optical transmission apparatus 10, the optical transmission apparatus 10 may be configured to transmit the first main signal and the second main signal at the same wavelength. In this case, also in the optical reception apparatus 40, physical ports are prepared separately for the main signal transfer unit 41 and the reception processing unit 42.

With such a configuration, while the number of physical ports required increases, an increase in the transmission band can be suppressed.

Figure 6:
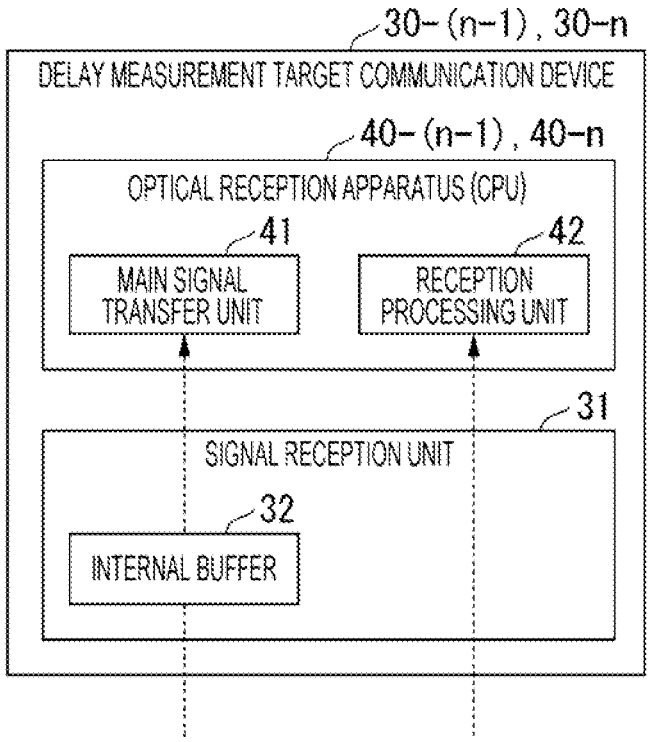
FIG. 6 is a diagram illustrating a configuration of a delay measurement target communication device in a case where an optical reception apparatus is implemented as software operating on a processor.

In the above embodiment, an example has been described in which the optical reception apparatuses 40-(n−1) to 40-n are implemented as hardware parts in the delay measurement target communication devices 30-(n−1) to 30-n. The optical reception apparatuses 40-(n−1) to 40-n may be implemented as software that operates on a processor such as a central processing unit (CPU). A configuration in this case is illustrated in FIG. 6. FIG. 6 is a diagram illustrating the configuration of the delay measurement target communication devices 30-(n−1) to 30-n in a case where an optical reception apparatus is implemented as software operating on a processor. The delay measurement target communication devices 30-(n−1) to 30-n include a signal reception unit 31 and optical reception apparatuses 40-(n−1) to 40-n.

The signal reception unit 31 receives main signals transmitted from the optical transmission devices 20-(n−1) to 20-n. The signal reception unit 31 outputs the received main signals to the optical reception apparatuses 40-(n−1) to 40-n. For example, the signal reception unit 31 is a network interface card (NIC). The signal reception unit 31 includes an internal buffer 32. The internal buffer 32 holds a first main signal (a main signal via the delay measurement target communication device 30).

Upon receiving the second main signal (the main signal that is not transmitted via the delay measurement target communication device 30), the signal reception unit 31 applies an interruption or the like to the optical reception apparatuses 40-(n−1) to 40-n with the highest priority to notify of the reception of the main signal. Then, the reception processing units 42 in the optical reception apparatuses 40-(n−1) to 40-n record the time at which the notification has been received as a reception time t1. On the other hand, the first main signal (the main signal via the delay measurement target communication device 30) is held in the internal buffer 32 in the signal reception unit 31. The optical reception apparatuses 40-(n−1) to 40-n record the time when the first main signal has been received from the internal buffer 32 as a reception time t2. The reception processing unit 42 calculates the delay time using the reception time t1 and the reception time t2. The delay time also includes a queuing delay in the internal buffer 32.

In the above embodiment, the optical transmission apparatus 10 in the first embodiment has been described as an example of the optical transmission apparatus 10. In the third embodiment, the optical transmission apparatus 10a in the second embodiment may be used as the optical transmission apparatus 10. In such a configuration, the optical transmission device 20-1 has a configuration similar to that of the optical transmission device 20a in the second embodiment.

Fourth Embodiment

In the first to third embodiments, the configuration in a case where the main signal input to the optical transmission apparatus is an optical signal has been described. In a fourth embodiment, a configuration in a case where a main signal input to an optical transmission apparatus is an electrical signal will be described.

Figure 7:
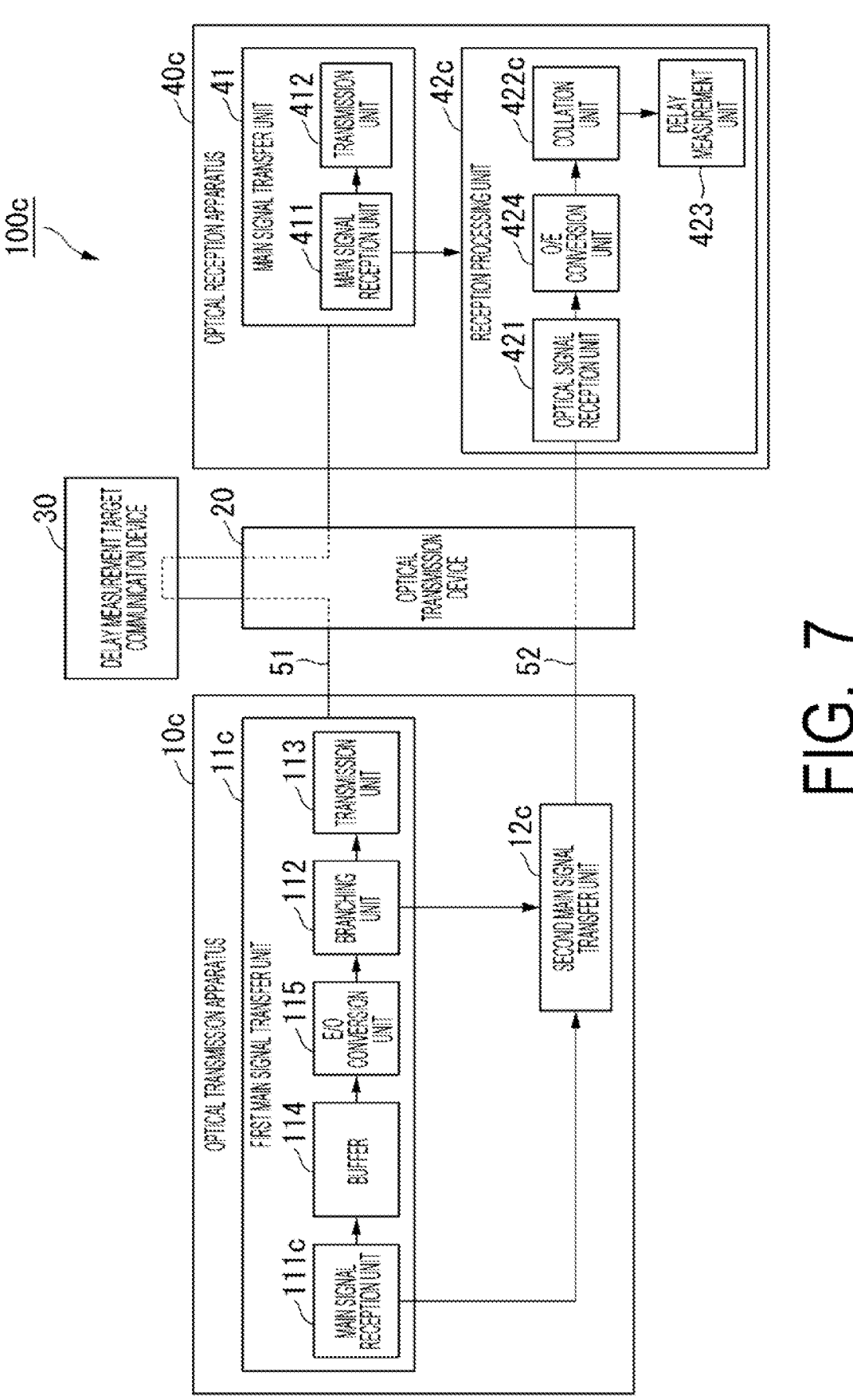
FIG. 7 is a diagram illustrating a system configuration of an optical transmission system according to a fourth embodiment.

FIG. 7 is a diagram illustrating a system configuration of an optical transmission system 100c according to the fourth embodiment. The optical transmission system 100c includes an optical transmission apparatus 10c, an optical transmission device 20, a delay measurement target communication device 30, and an optical reception apparatus 40c. The optical transmission apparatus 10c and the optical transmission device 20, the optical transmission device 20 and the delay measurement target communication device 30, and the optical transmission device 20 and the optical reception apparatus 40c are connected to each other via optical transmission lines.

The optical transmission system 100c according to the fourth embodiment is different from the optical transmission system 100 according to the first embodiment in configurations of the optical transmission apparatus 10c and the optical reception apparatus 40c. Hereinafter, differences from the first embodiment will be described.

Upon receiving a main signal from a device such as an adjacent network or server, the optical transmission apparatus 10c transmits the received main signal to the optical transmission device 20 via lines 51 and 52 that are optical transmission lines. In the fourth embodiment, a main signal of an electrical signal is input to the optical transmission apparatus 10c. The lines 51 and 52 may be physically provided in the same fiber, or may be provided in different independent fibers. In a case where the line 51 and the line 52 are physically provided in the same fiber, a method of wavelength-multiplexing main signals transmitted from the optical transmission apparatus 10 at different wavelengths and transmitting the wavelength-multiplexed main signals can be considered. In the fourth embodiment, a case where the line 51 and the line 52 are physically provided in the same fiber will be described as an example.

The optical reception apparatus 40c measures a processing delay in the delay measurement target communication device 30 by using a plurality of main signals transmitted from the optical transmission device 20. For example, the optical reception apparatus 40c measures the processing delay in the delay measurement target communication device 30 by calculating the difference between the reception time of the first main signal and the reception time of the second main signal. In the optical reception apparatus 40c in the fourth embodiment, the first main signal and the second main signal, which are received optical signals, are respectively converted into electrical signals, and the first main signal and the second main signal are collated.

Next, specific configurations of functional units of the optical transmission apparatus 10c and the optical reception apparatus 40c will be described.

The optical transmission apparatus 10c includes a first main signal transfer unit 11c and a second main signal transfer unit 12c. The first main signal transfer unit 11c transmits the first main signal to the optical transmission device 20. The first main signal transfer unit 11c includes a main signal reception unit 111c, a buffer 114, an E/O conversion unit 115, a branching unit 112, and a transmission unit 113.

The main signal reception unit Ille receives a main signal of an electrical signal from a device such as an adjacent network or server. The main signal reception unit 111c stores the main signal in the buffer 114. Here, the main signal reception unit 111c notifies the second main signal transfer unit 12c of the transmission timing of the main signal at the timing of storing the main signal in the buffer 114. Accordingly, the delay time including the queuing delay of the buffer 114 inside the first main signal transfer unit 11c and the electro-optical conversion delay in the E/O conversion unit 115 can be measured on the optical reception apparatus 40c side. In a case where the main signal is a packet, the main signal reception unit 111c adds a virtual local area network (VLAN) tag for collation in the optical reception apparatus 40c. Note that the VLAN tag maintains uniqueness by counting up, taking a hash value of a packet, or the like every time a combination of the first main signal and the second main signal is transmitted.

When it is desired to measure the delay occurring in the delay measurement target communication device 30 without including the queuing delay of the buffer 114 inside the first main signal transfer unit 11c and the electro-optical conversion delay in the E/O conversion unit 115, the transmission unit 113 may notify the second main signal transfer unit 12c of the transmission timing of the first main signal before transmitting the first main signal, as in the first embodiment.

The buffer 114 is a storage unit that holds a main signal for performing electrical processing. The buffer 114 stores one or more main signals.

The E/O conversion unit 115 electro-optically converts the main signal of the electrical signal held in the buffer 114 into an optical signal.

The optical reception apparatus 40c includes a main signal transfer unit 41 and a reception processing unit 42c. The reception processing unit 42c processes the main signal received by the optical reception apparatus 40c. The reception processing unit 42c includes an optical signal reception unit 421, an O/E conversion unit 424, a collation unit 422c, and a delay measurement unit 423.

The O/E conversion unit 424 performs photoelectric conversion on the first main signal of the optical signal output from the main signal transfer unit 41 and the second main signal of the optical signal output from the optical signal reception unit 421, and converts the first main signal and the second main signal into electrical signals.

The collation unit 422c collates whether the first main signal and the second main signal received by the optical reception apparatus 40c are main signals of the same data by using the first main signal and the second main signal converted into the electrical signal.

Figure 8:
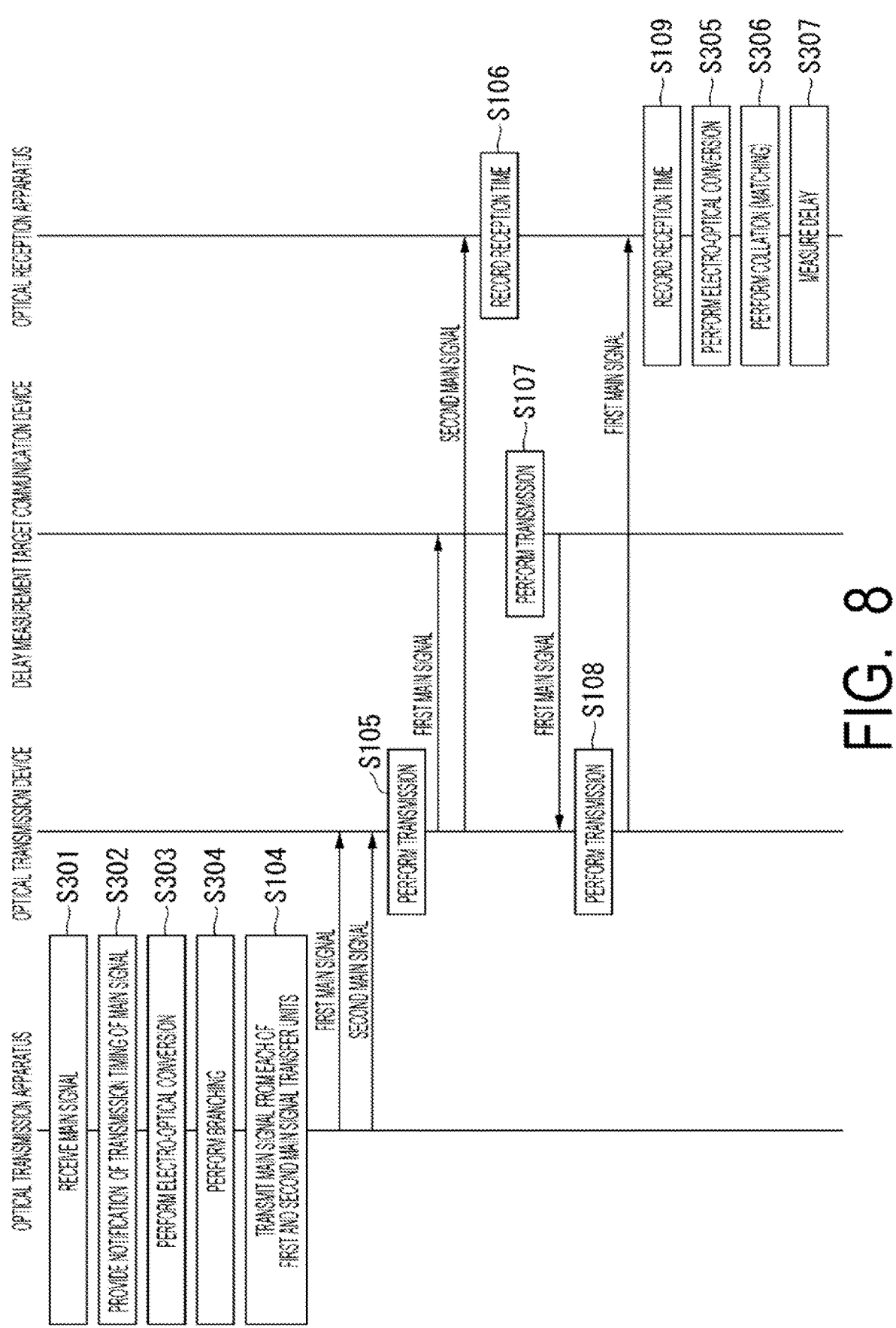
FIG. 8 is a sequence diagram illustrating a flow of processing of the optical transmission system according to the fourth embodiment.
Figure 9:
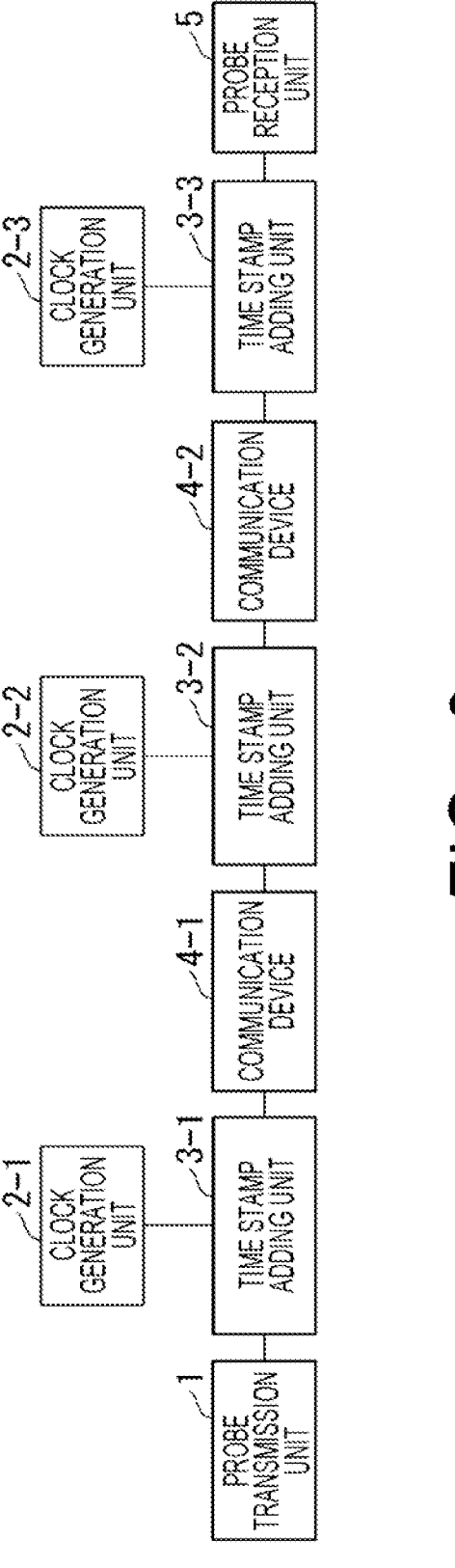
FIG. 9 is a diagram illustrating a method shown in Non Patent Literature 1.

FIG. 8 is a sequence diagram illustrating a flow of processing of the optical transmission system 100c according to the fourth embodiment. In FIG. 8, the same processing steps as those in FIG. 2 are denoted by the same reference numerals as those used in FIG. 2, and description thereof is omitted.

The main signal reception unit 111c receives a main signal (electrical signal) from the outside (step S301). The main signal reception unit 111c stores the received main signal in the buffer 114. At this time, the main signal reception unit 111c notifies the second main signal transfer unit 12c of the transmission timing of the main signal (step S302).

The E/O conversion unit 115 reads the main signal stored in the buffer 114 and performs electro-optical conversion (step S303). Thereby, the main signal is converted into an optical signal. The E/O conversion unit 115 outputs the main signal after the electro-optical conversion to the branching unit 112. The main signal output from the E/O conversion unit 115 is branched by the branching unit 112 (step S304), and is input to the transmission unit 113 and the second main signal transfer unit 12c.

Thereafter, the processing from step S104 to step S109 is executed. The O/E conversion unit 424 photoelectrically converts each of the first main signal output from the main signal transfer unit 41 and the second main signal received by the optical signal reception unit 421 (step S305). Accordingly, the first main signal and the second main signal are converted into electrical signals. The O/E conversion unit 424 outputs the first main signal and the second main signal after photoelectric conversion to the collation unit 422c.

The collation unit 422c collates whether the first main signal and the second main signal received by the optical reception apparatus 40c are main signals of the same data by using the photoelectrically converted first main signal and second main signal output from the main signal transfer unit 41 (step S306). Specifically, the collation unit 422c compares the VLAN tags attached to the first main signal and the second main signal. In a case where the VLAN tags attached to the first main signal and the second main signal match, the collation unit 422c determines that the first main signal and the second main signal after photoelectric conversion are main signals transmitted at the same timing. On the other hand, in a case where the VLAN tags attached to the first main signal and the second main signal do not match, the collation unit 422c determines that the first main signal and the second main signal after photoelectric conversion are not main signals transmitted at the same timing.

Here, description will be made on the assumption that the first main signal and the second main signal after photoelectric conversion match. The collation unit 422 outputs the first reception time information of the matched first main signal and the second reception time information of the matched second main signal to the delay measurement unit 423. The delay measurement unit 423 measures a delay occurring in the delay measurement target communication device 30 by using the first reception time information and the second reception time information output from the collation unit 422 (step S307). Specifically, the delay measurement unit 423 calculates the delay time occurring in the delay measurement target communication device 30 by subtracting the time indicated by the first reception time information from the time indicated by the second reception time information.

According to the optical transmission system 100c configured as described above, effects similar to those of the first embodiment can be obtained.

Furthermore, in the optical transmission system 100c, it is possible to measure the delay occurring in the delay measurement target communication device 30 even in a case where the main signal is an electrical signal.

Hereinafter, a modification of the optical transmission system 100c according to the fourth embodiment will be described.

In a case where signal collision does not occur between the line 51 and the line 52, such as a case where wavelength conversion is performed at the time of dropping and adding from the optical transmission device 20 to the delay measurement target communication device 30, or a case where physical ports are separately prepared for the first main signal transfer unit 11c and the second main signal transfer unit 12c in the optical transmission apparatus 10c, the optical transmission apparatus 10c may be configured to transmit the first main signal and the second main signal at the same wavelength. In this case, also in the optical reception apparatus 40c, physical ports are prepared separately for the main signal transfer unit 41 and the reception processing unit 42c.

With such a configuration, while the number of physical ports required increases, an increase in the transmission band can be suppressed.

In the above embodiment, the configuration in the case where the main signal input to the optical transmission apparatus is an electrical signal in the configuration of the first embodiment has been described. The configuration in the case where the main signal is an electrical signal as in the fourth embodiment is also applicable to the second embodiment and the third embodiment. Hereinafter, a configuration in a case where the main signal input to the optical transmission apparatus is an electrical signal in the second embodiment will be described.

In the second embodiment, a case where the main signal input to the optical transmission apparatus 10a is an electrical signal will be described. The main signal transfer unit 11a of the optical transmission apparatus 10a includes a buffer 114 and an E/O conversion unit 115 between the main signal reception unit 111 and the transmission unit 113a.

The main signal reception unit ill receives a main signal of an electrical signal from a device such as an adjacent network or server. The main signal reception unit 111 stores the main signal in the buffer 114. The E/O conversion unit 115 electro-optically converts the main signal of the electrical signal held in the buffer 114 into an optical signal. The transmission unit 113a transmits the main signal converted into the optical signal by the E/O conversion unit 115 to the line 51.

The optical reception apparatus 40 has a configuration similar to that of the optical reception apparatus 40c in the fourth embodiment.

Some functional units included in each of the optical transmission apparatus 10, the optical transmission device 20, the delay measurement target communication device 30, and the optical reception apparatus 40 in the above-described embodiments may be implemented by a computer. In such a case, a program for implementing the functions may be recorded in a computer-readable recording medium, and the functions may be implemented by loading the program recorded on this recording medium to a computer system, and executing the program. Note that the "computer system" mentioned herein includes an OS and hardware such as peripheral devices. Also, the "computer-readable recording medium" is a portable medium such as a flexible disk, a magneto-optical disc, a ROM, or a CD-ROM, or a storage device such as a hard disk embedded in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside a computer system serving as a server or a client in that case. Also, the foregoing program may be for implementing some of the functions described above, may be implemented in a combination of the functions described above and a program already recorded in a computer system, or may be implemented with a programmable logic device such as a field programmable gate array (FPGA).

Although the embodiments of the present invention have been described in detail with reference to the drawings, specific configurations are not limited to the embodiments, and include design and the like within the scope of the present invention without departing from the gist of the present invention.

INDUSTRIAL APPLICABILITY

The present invention can be applied to a technique for measuring a delay in an optical transmission system.

REFERENCE SIGNS LIST 10, 10a, 10c Optical transmission apparatus
11 First main signal transfer unit
11a Main signal transfer unit 12, 12c Second main signal transfer unit
20, 20-1 to 20-n, 20a Optical transmission device
21 Branching unit
30, 30-1 to 30-n Delay measurement target communication device
40, 40-1 to 40-n, 40c Optical reception apparatus
41 Main signal transfer unit
42, 42c Reception processing unit
111 Main signal reception unit
112 Branching unit
113, 113a Transmission unit
114 Buffer
115 E/O conversion unit
411 Main signal reception unit
412 Transmission unit
421 Optical signal reception unit
422 Collation unit
423 Delay measurement unit
424 O/E conversion unit

The invention claimed is:

1. An optical transmission system comprising: an optical transmission apparatus; an optical reception apparatus; a communication device that is a delay measurement target; and a transmission device that transmits a signal between the optical reception apparatus and the communication device,
   wherein the optical transmission apparatus includes
   a main signal transfer circuitry configured to transmit a main signal,
   the transmission device transmits, to the optical reception apparatus, a first main signal transmitted from the optical transmission apparatus and transmitted via the communication device and a second main signal transmitted from the optical transmission apparatus and not transmitted via the communication device, and
   the optical reception apparatus includes
   a reception processor configured to measure a delay occurring in the communication device by using the first main signal and the second main signal transmitted from the transmission device,
   wherein the reception processor measures the delay occurred by transmitting a main signal after execution of predetermined signal processing by the transmission device as the first main signal to the transmission device after the communication device performs predetermined signal processing on the main signal transmitted from the optical transmission device and transmitted by the transmission device.

2. The optical transmission system according to claim 1,
   wherein the main signal transfer circuitry included in the optical transmission apparatus includes a first main signal transfer circuitry and a second main signal transfer circuitry,
   the first main signal transfer circuitry transmits the main signal after branching the main signal and outputting the main signal to the second main signal transfer circuitry,
   the second main signal transfer circuitry transmits the main signal in accordance with a transmission timing of the first main signal transfer circuitry, and
   the transmission device transmits the first main signal, which is the main signal transmitted from the first main signal transfer circuitry, to the communication device, and transmits the second main signal, which is the main signal transmitted from the second main signal transfer circuitry, to the optical reception apparatus.

3. The optical transmission system according to claim 1, wherein the transmission device includes a splitter configured to branch the main signal transmitted from the optical transmission apparatus, and transmits the main signal branched by the splitter to the communication device and the optical reception apparatus as the first main signal and the second main signal.

4. The optical transmission system according to claim 1, wherein n (n is an integer of 3 or more) units of the transmission device, the communication device, and the optical reception apparatus are provided, each of the (n−1)-th to n-th transmission devices includes the optical reception apparatus, the (n−1)-th transmission device includes a splitter that branches a main signal transmitted from a preceding transmission device, and transmits the first main signal that is the main signal transmitted via at least one communication device and the second main signal that is the main signal branched by the splitter and not transmitted via the communication device to a communication device connected thereto, and the n-th transmission device transmits the first main signal and the second main signal to a communication device connected thereto.

5. The optical transmission system according to claim 1, wherein the reception processor of the optical reception apparatus converts each of the first main signal and the second main signal into an electrical signal, compares identification information given by the optical transmission apparatus or the electrical signals, determines that the first main signal and the second main signal are main signals of the same data in a case where the identification information or the electrical signals match, and measures a delay occurring in the communication device by using the first main signal and the second main signal of the same data.

6. The optical transmission system according to claim 1, wherein the reception processor of the optical reception apparatus measures a delay occurring in the communication device by calculating a difference between a reception time of the first main signal and a reception time of the second main signal.

7. An optical reception apparatus in an optical transmission system including an optical transmission apparatus, the optical reception apparatus, a communication device that is a delay measurement target, and a transmission device that transmits a signal between the optical reception apparatus and the communication device, the optical reception apparatus comprising:

a reception processor configured to measure a delay occurring in the communication device by using a first main signal transmitted from the optical transmission apparatus and transmitted at least via the communication device and a second main signal transmitted from the optical transmission apparatus and not transmitted via the communication device, wherein the reception processor measures the delay occurred by transmitting a main signal after execution of predetermined signal processing by the transmission device as the first main signal to the transmission device after the communication device performs predetermined signal processing on the main signal transmitted from the optical transmission device and transmitted by the transmission device.

8. A delay measurement method in an optical transmission system including an optical transmission apparatus, an optical reception apparatus, a communication device that is a delay measurement target, and a transmission device that transmits a signal between the optical reception apparatus and the communication device, the delay measurement method comprising:

transmitting, by the optical transmission apparatus, a main signal;

transmitting, by the transmission device, to the optical reception apparatus, a first main signal transmitted from the optical transmission apparatus and transmitted via the communication device and a second main signal transmitted from the optical transmission apparatus and not transmitted via the communication device; and measuring, by the optical reception apparatus, a delay occurring in the communication device by using the first main signal and the second main signal transmitted from the transmission device, measuring, by the optical reception apparatus, the delay occurred by transmitting a main signal after execution of predetermined signal processing by the transmission device as the first main signal to the transmission device after the communication device performs predetermined signal processing on the main signal transmitted from the optical transmission device and transmitted by the transmission device.

* * * * *